(12) United States Patent
Paleczny et al.

(10) Patent No.: US 8,823,898 B2
(45) Date of Patent: Sep. 2, 2014

(54) SUSPENSION AND TOLERANCE ABSORPTION SUBASSEMBLY FOR A DISPLAY SCREEN

(75) Inventors: Todd Robert Paleczny, Heidelberg (CA); Farzin Dehmoubed, Woodbridge (CA)

(73) Assignee: BlackBerry Limited, Waterloo, Ontario (CA)

( * ) Notice: Subject to any disclaimer, the term of this patent is extended or adjusted under 35 U.S.C. 154(b) by 686 days.

(21) Appl. No.: 13/092,268

(22) Filed: Apr. 22, 2011

(65) Prior Publication Data

US 2012/0268667 A1    Oct. 25, 2012

(51) Int. Cl.
*G02F 1/1335*    (2006.01)
*G02F 1/1345*    (2006.01)
*F21V 7/04*    (2006.01)

(52) U.S. Cl.
USPC ............... 349/60; 349/58; 349/149; 362/611; 362/612; 362/631; 362/632; 362/634

(58) Field of Classification Search
CPC ............ G06F 3/0488; G02F 1/133308; G02F 2001/133317; G02F 2001/133314
USPC .................. 349/1, 60, 149; 362/332–334; 632/611–615, 632–634
See application file for complete search history.

(56) References Cited

U.S. PATENT DOCUMENTS

| | | | |
|---|---|---|---|
| 2,811,408 A * | 10/1957 | Braley | 264/338 |
| 4,422,728 A | 12/1983 | Andreaggi | |
| 5,002,368 A | 3/1991 | Anglin | |
| 5,363,227 A | 11/1994 | Ichikawa et al. | |
| 5,369,399 A | 11/1994 | Tribbey et al. | |
| 5,486,942 A | 1/1996 | Ichikawa et al. | |
| 5,774,199 A | 6/1998 | Ozawa | |
| 5,929,950 A | 7/1999 | Matsuda | |
| 6,034,751 A | 3/2000 | Kamiya | |
| 8,049,836 B2 * | 11/2011 | Huang et al. | 349/58 |
| 2002/0003595 A1 | 1/2002 | Yazawa | |
| 2007/0268425 A1 * | 11/2007 | Jung | 349/58 |
| 2008/0158473 A1 * | 7/2008 | Liang | 349/60 |
| 2008/0259239 A1 * | 10/2008 | Fang | 349/60 |
| 2010/0188599 A1 * | 7/2010 | Arihara | 349/60 |
| 2011/0080350 A1 * | 4/2011 | Almalki et al. | 345/173 |

FOREIGN PATENT DOCUMENTS

| | | |
|---|---|---|
| EP | 0503427 | 9/1992 |
| EP | 0642089 | 3/1995 |
| EP | 2194423 A1 | 6/2010 |
| JP | 08160398 | 6/1996 |
| JP | 63313130 | 12/1998 |

OTHER PUBLICATIONS

Knutsson, Frederic, Extended European Search Report for EP 11163568.6, Sep. 20, 2011.

(Continued)

*Primary Examiner* — Hoan C Nguyen
(74) *Attorney, Agent, or Firm* — Integral Intellectual Property Inc.; Miriam Paton

(57) ABSTRACT

A display screen of an electronic device may be supported by one or more subassemblies positioned between the display screen and a printed circuit board to which the display screen is secured. Each subassembly is able to act as an independent suspension for the display screen and is able to cushion the display screen by absorbing mechanical tolerances and mechanical shock and vibration. The subassemblies may be mounted on the printed circuit board using surface mount technology.

18 Claims, 6 Drawing Sheets

(56) References Cited

OTHER PUBLICATIONS

Bordovsky, Michal, First Office Action for CA2,778,324, Jan. 31, 2014.

Knutsson, Frederic, First Examination Report for EP 11163568.6, Dec. 18, 2013.

* cited by examiner

SUSPENSION AND TOLERANCE ABSORPTION SUBASSEMBLY FOR A DISPLAY SCREEN

TECHNICAL FIELD

The technology described herein generally relates to a structure for supporting a display screen, and particularly to a shock-absorbing structure.

BACKGROUND

Many modern electronic devices are equipped with a display screen, such as a liquid crystal display (LCD), that is electrically connected to a printed circuit board (PCB) within the device. The display screen may be secured to the printed circuit board using, for example, adhesives, clips or screws.

The display screen of an electronic device may be fragile, and therefore it may be of interest to protect the display screen from damage. The display screen of a mobile electronic device, such as a mobile communications device, a laptop computer, or a tablet computer, may be particularly vulnerable to damage due to the portable nature of the device. For example, a mobile communications device may be dropped by a user, and its display screen may be damaged as a result of the shock and/or vibration associated with the impact. A display screen with touch-screen functionality may also be vulnerable to damage resulting from pressure applied by the user's finger, for example.

A display screen of an electronic device may also be susceptible to damage resulting from pressure received from other components of the electronic device. For example, deviations from the nominal dimensions of one or more of components of the electronic device, including the display screen itself, may apply stress to the display screen.

BRIEF DESCRIPTION OF THE DRAWINGS

FIG. 5-1 is a perspective view of four example suspension and tolerance absorption subassemblies mounted to a printed circuit board;

FIG. 5-2 is a fragmentary perspective view of a display screen supported on a printed circuit board by one of the example suspension and tolerance absorption subassemblies illustrated in FIG. 1;

DETAILED DESCRIPTION

A display screen of an electronic device may be supported by one or more subassemblies positioned between the display screen and a printed circuit board (PCB) or any mechanical support structure to which the display screen may be physically secured and electrically connected. Each subassembly is able to act as an independent suspension for the display screen and is able to cushion the display screen by absorbing mechanical tolerances and mechanical shock and vibration. These subassemblies may be used, for example, for suspension of a display screen of a mobile communications device, a laptop computer, a tablet computer, or any other electronic device having a display screen.

Figure 1:
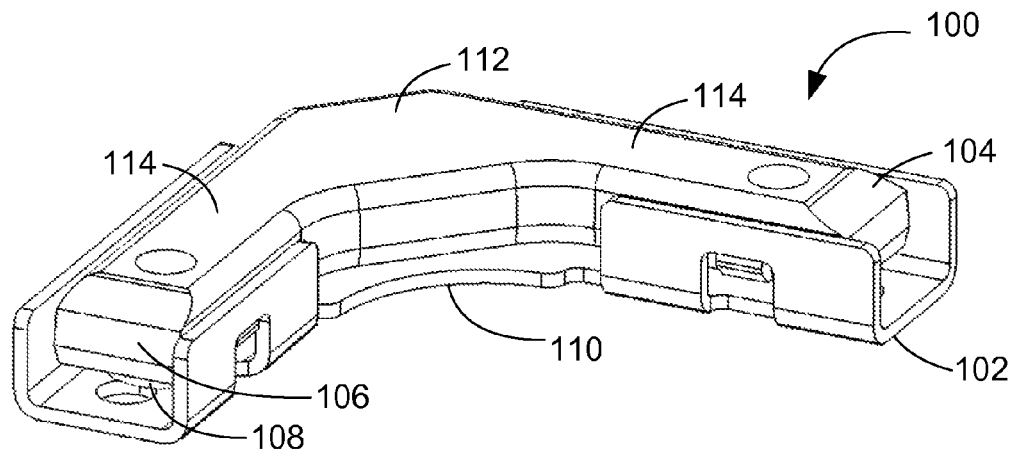
FIG. 1 is a top perspective view of an example suspension and tolerance absorption subassembly for a display screen.

FIG. 1 illustrates a top perspective view of an example suspension and tolerance absorption subassembly for a display screen, hereinafter subassembly 100. Subassembly 100 comprises a first member 102 and a second member 104, the second member 104 having an outer portion 106 and a flexible inner portion 108. Inner portion 108 is "inner" in the sense that it is interposed between first member 102 and outer portion 106 of second member 104 (and consequently in the assembled subassembly 100 may be less easily visible than first member 102 and outer portion 106 of second member 104). An outer surface 110 of first member 102 is to be proximate to (typically in physical contact with, and in an illustrative implementation, affixed to) a PCB (not shown in FIG. 1), while an outer surface 112 of second member 104 is to be proximate to (typically in physical contact with) a rear surface of a display screen (not shown in FIG. 1). In general, the PCB (in addition to other functions) serves as a framework to which various components, such as the display screen, are secured. As will be discussed below, first member 102 may be considered to be an example of a first substantially rigid support means, outer portion 106 of second member 104 may be considered to be an example of a second substantially rigid support means, and inner portion 108 of second member 104 may be considered to be an example of a flexible (or resilient) cushioning means.

Suspension and tolerance absorption subassembly 100 is illustrated herein as having an L-shaped configuration with two arms 114. However, alternative configurations are contemplated, including, but not limited to, an I-shaped configuration and a square-shaped configuration. Overall dimensions may vary, but for a typical L-shaped configuration, each arm may be about seven millimeters long and about two millimeters wide, and the assembled subassembly may be about one and a quarter millimeters thick.

Figure 2:
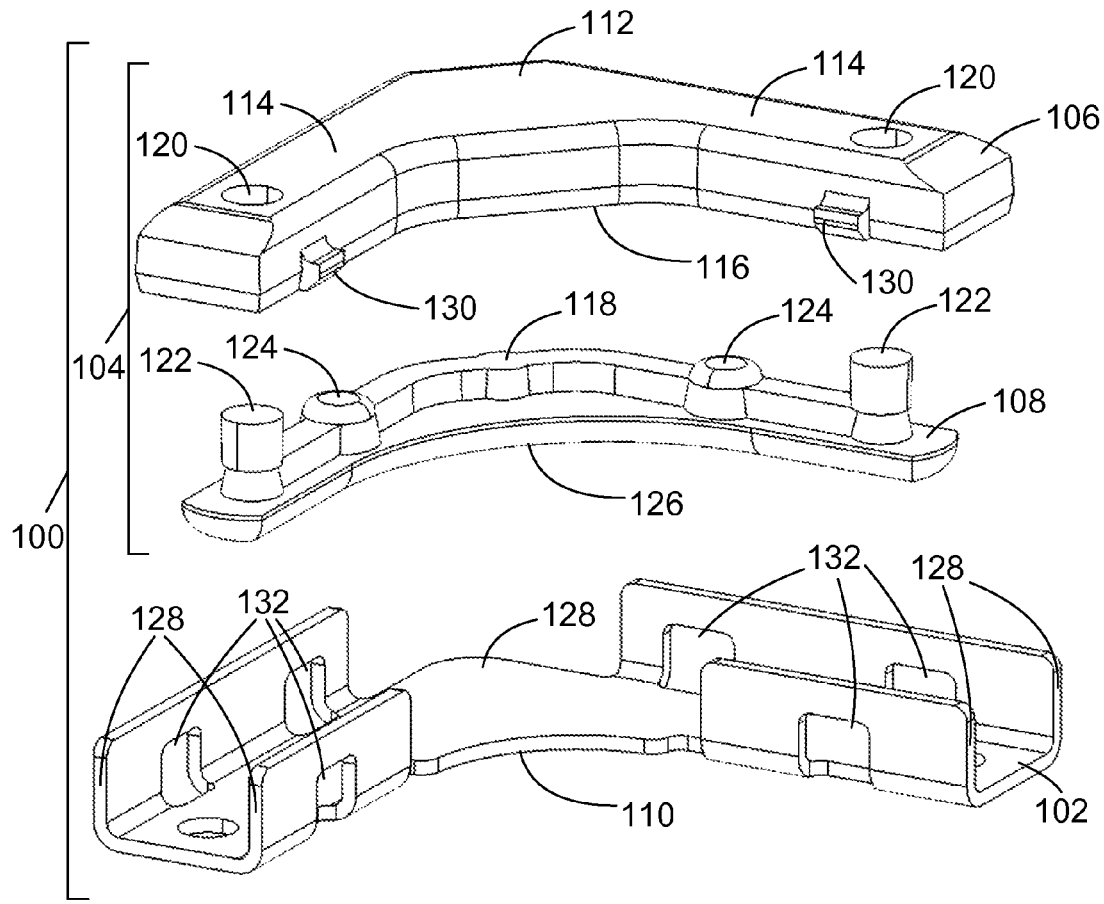
FIG. 2 is an exploded view of the example suspension and tolerance absorption subassembly illustrated in FIG. 1.

FIG. 2 illustrates an exploded perspective view of the example suspension and tolerance absorption subassembly illustrated in FIG. 1. In FIG. 2, first member 102 is shown apart from second member 104, and second member 104 is in turn shown with outer portion 106 apart from flexible inner portion 108.

Outer surface 110 of first member 102 of subassembly may be affixed to a PCB. For purposes of illustration, it will be assumed that first member 102 of subassembly may be affixed to the PCB by soldering, and first member 102 may be composed of any metal to which solder may be bonded. Examples of such metals include ferrous and non-ferrous metals, such as cold-rolled steel, stainless steel, tin-plated stock, or other coil stock. In one example, first member 102 is formed from cold-rolled steel #1008 or #1010 or from #304 stainless steel coil stock. First member 102 may be formed into the desired shape using progressive stamping according to traditional methods, for example. A material hardness of ¼, ½, ¾, or a full hard material may be used. Various other rigid and durable materials, such as plastics, may also be used, and they may be affixed to the PCB by a technique other than soldering (such as by an adhesive, spot welding, a mechanical connector such as a screw, etc.).

Outer surface 112 of second member 104 may bear against or be held in physical contact with a rear surface of the display screen by an external force. Adhesive, or another instrumentality for holding the components together, is usually not necessary to cause the display screen to bear against outer surface 112. The external force may be applied by, for example, connective elements that mount or otherwise physically secure the display screen to the PCB, as described below. Outer portion 106 of second member 104 is composed of a material that is typically hard, rigid and durable. Examples of such materials include polymer plastics such as polycarbonate (PC), acrylonitrile butadiene styrene (ABS), or PC/ABS blends. In one example, outer portion 106 of second member 104 is formed from Lexan siloxane copolymer resin. Outer portion 106 may be formed into the desired shape by injection molding, for example. Outer portion 106 of second member 104 may also be made of various metals or other hard, rigid or durable materials.

Inner portion 108 of second member 104 is composed of a flexible or resilient material (typically more flexible than outer portion 106), including, for example, silicone rubber. In one example, inner portion 108 of second member 104 is formed from liquid silicone rubber. The silicone rubber may be, for example, in the range of 30-70 durometer, such as 40 durometer. Inner portion 108 may be formed into the desired shape by injection molding, for example.

In general, the materials that make up subassembly 100 may be able to withstand reflow oven temperatures. For example, the materials that make up subassembly 100 may be able to withstand up to three passes in a reflow oven, including one pass for the front side of the PCB, one pass for the back side of the PCB and one spare pass. The capability of handling reflow oven temperatures is not essential to the concepts described herein, but this capability can make manufacturing more convenient and efficient.

An inner surface 116 of outer portion 106 may be bonded to an inner surface 118 of inner portion 108. This bond may be a mechanical bond or a chemical bond (with or without adhesive) or both. For example, inner portion 108 may be co-molded to outer portion 106, with a chemical bond being formed at the surface(s) of contact between portions 106 and 108, preventing their ready separation. A silicone inner portion 108 may be particularly suited for co-molding to a plastic outer portion 106 because silicone is able to maintain dimensional stability and temperature stability while still providing the flexibility to absorb mechanical tolerances and shock.

Outer portion 106 and inner portion 108 of second member 104 may be mechanically bonded to one another in any of many ways. For example, outer portion 106 may be injection-molded into a shape comprising one or more recesses (such as apertures, indentations, grooves, notches, etc.), and inner portion 108 may be co-molded to outer portion 106 into a shape comprising one or more mating or complementary protrusions, each one of the one or more protrusions filling or otherwise engaging a corresponding one of the one or more recesses. The engagement of the recesses of outer portion 106 with the protrusions of inner portion 108 may provide a mechanical bond between outer portion 106 and inner portion 108, preventing separation of portions 106 and 108. Other forms of mechanical bonding, such as the use of screws or clips or clamps to hold the outer portion 106 and inner portion 108 together, are usually unnecessary.

For example, as illustrated in FIG. 2, outer portion 106 may comprise holes 120, while inner portion 108 may comprise complementary protrusions 122. Inner portion 108 may also comprise additional protrusions 124 corresponding to recesses (not shown) in outer portion 106. Although not explicitly illustrated, additional and alternative protrusions and recesses may be used to provide mechanical bonding between outer portion 106 and inner portion 108 of second member 104. Holes 120 and any recesses in outer portion 106 may be formed, for example, as a result of the shape of the injection mold cavity used to form the outer portion 106. Protrusions 122 and additional protrusions 124 of inner portion 108 may be formed, for example, as a result of the shape of outer portion 106, to which inner portion 108 is co-molded.

Outer portion 106 and inner portion 108 may be formed by the same manufacturer or by different manufacturers. For example, outer portion 106 may be formed by a first manufacturer and delivered to a second manufacturer where inner portion 108 is formed. In some constructions, inner portion 108 may be formed and engaged to outer portion 106 in a single process. In other constructions, inner portion 108 and outer portion 106 may be formed apart, and mated in a separate assembly process.

A surface 126 of inner portion 108 of second member 104 is to be held proximate to (usually in contact with) an inner surface 128 of first member 102. In other words, the assembled second member 104 (which includes outer portion 106 and flexible inner portion 108) is to be mated to first member 102. Mating may be accomplished in any of several ways, including snap-fitting second member 104 to first member 102.

For example, as illustrated in FIG. 2, first member 102 may comprise one or more channel-shaped portions 128 (which may be formed, as depicted in FIG. 2, by side structures substantially perpendicular to outer surface 110 of first member 102), where each channel-shaped portion 128 is to receive a corresponding portion of second member 104, in this case, arm 114. Outer portion 106 may comprise one or more projections 130 extending in a direction substantially parallel to inner surface 126. Projections 130 may be snap-fit into a corresponding opening 132 located in a side of one of channel-shaped portions 128. (In general, a snap-fit assembly is one in which components are physically attached or engaged by one or more locking features that deform to enable the attachment or engagement, then "snap" back from the deformation to maintain or lock the attachment or engagement.) The formation of channel-shaped portions 128 and openings 132 in first member 102 may be done using progressive stamping. Although first member 102 and outer portion 106 of second member 104 may be generally rigid and durable, the constructions of these members may accommodate elastic deformation to enable or facilitate the snap-fitting. Once parts are snap-fit to one another, they are not readily separable from one another.

First member 102 may be formed before or after second member 104 or simultaneously with second member 104. First member 102 and second member 104 may be formed by the same manufacturer or by different manufacturers. For example, one or both of first member 102 and second member 104 may be delivered separately to a manufacturer for construction of subassembly 100.

Figure 3:
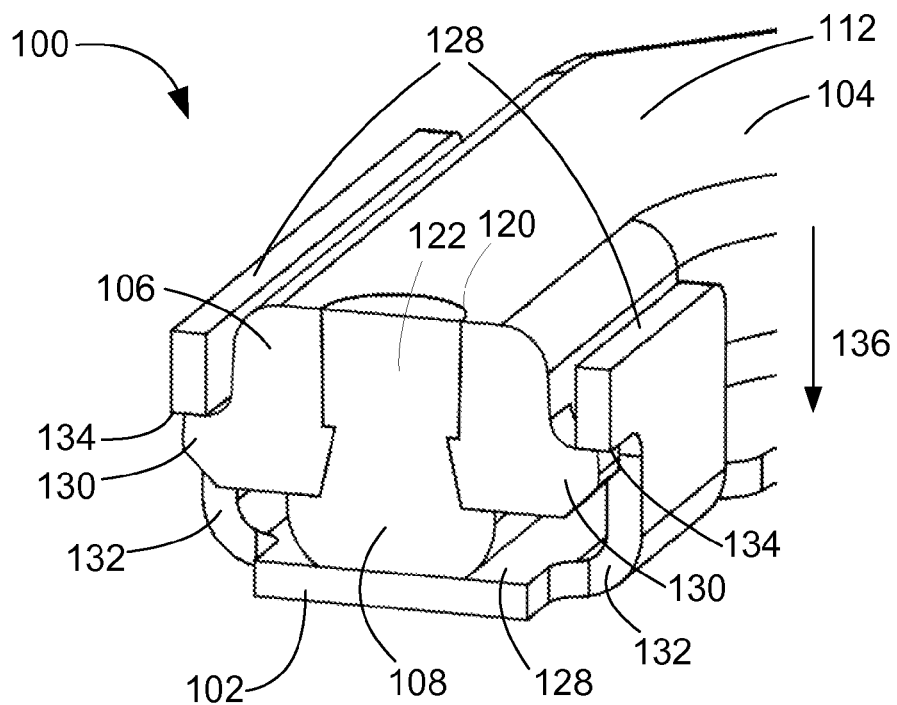
FIG. 3 is a cross-sectional fragmentary view of the example suspension and tolerance absorption subassembly illustrated in FIG. 1.

FIG. 3 illustrates a cross-sectional fragmentary view of example suspension and tolerance absorption subassembly 100 as illustrated in FIG. 1. In FIG. 3, the subassembly is assembled, with assembled second member 104 (which includes outer portion 106 and flexible inner portion 108) mated to first member 102. As described with respect to FIG. 2, in addition to any chemical bond that may be formed at the surface(s) of contact between outer portion 106 and inner portion 108 of second member 104, a mechanical bond may also be formed by the engagement of protrusions 122 of inner portion 108 with holes 120 of outer portion 106, preventing separation of portions 106 and 108.

The snap-fit between first member 102 and second member 104 is apparent from a joint 134 formed between each projection 130 of outer portion 106 of second member 104 and each opening 132 of first member 102. Projections 130 may be (for example) hook-shaped so as to prevent ready separation of second member 104 from first member 102.

Notably, the size of openings 132 may be larger than projections 130 being accommodated in openings 132. As a result, the extended size of openings 132 may permit limited movement of second member 104 relative to first member 102 in a direction illustrated by an arrow 136. For example, outer surface 112 of second member 104 may be brought closer to inner surface 128 of first member 102 upon compression of flexible inner portion 108. Motion in the direction opposite to arrow 136 may be constrained by joint 134, and motion orthogonal to arrow 136 may be constrained as well.

It is the flexibility of inner portion 108 of second member 104 that assists in the absorption of shock, vibration and mechanical tolerances, thereby enabling each subassembly 100 to act as a cushioning support for a display screen secured to a PCB. For example, subassembly 100 may reduce or prevent damage to a display screen of an electronic device that might normally result from shock and/or vibration associated with dropping the electronic device. Subassembly 100 may also provide cushioning to a display screen with touch-screen functionality, such that subassembly 100 may reduce or prevent damage to the display screen resulting from pressure applied by the user's finger. In another example, subassembly 100 may reduce stress to the display screen caused by deviations from the nominal dimensions of one or more of components of the electronic device.

Figure 4:
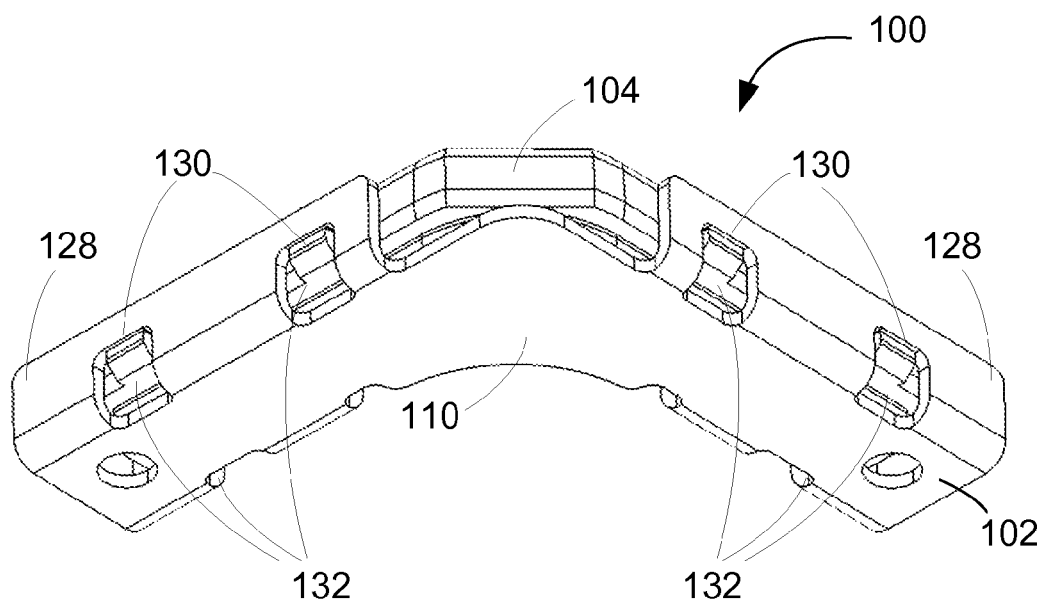
FIG. 4 is a bottom perspective view of the example suspension and tolerance absorption subassembly illustrated in FIG. 1.

FIG. 4 illustrates a bottom perspective view of the example suspension and tolerance absorption subassembly illustrated in FIG. 1. As described with respect to FIG. 2, second member 104 of subassembly 100 is snap-fit into first member 102 by snapping projections 130 of second member 104 into openings 132 of channel-shaped portions 128 of first member 102.

Although the concepts described herein are not necessarily restricted to particular materials, shapes or modes of assembly, many of the implementations (including the example implementations depicted in the figures) may advantageously aid in assembly. For example, second member 104 may be snap-fit into first member 102 forming subassembly 100, and subassembly 100 may be mounted on a PCB using surface mount technology (SMT) component placement systems, also known as pick-and-place robotic machines. Pick-and-place technology is a cost-effective means of placing surface mount components (SMCs) onto printed circuit boards with a high degree of accuracy. SMCs may be supplied on paper or plastic tape. In one example, a tape assembly comprises a cavity tape, a cover tape, and one or more SMCs held between the cavity tape and the cover tape. Reels of this tape may be loaded onto feeders mounted to the pick-and-place machine. These feeders are known as tape-and-reel feeders. The pick-and-place machine normally uses suction nozzles to pick up individual components from tape-and-reel feeders, to rotate the components to the correct orientation and to place them on the appropriate locations on the PCB with high precision. The ability to position subassembly 100 on a PCB may be advantageous in the assembly of an electronic device, and the advantages may be terms of efficiency, speed, cost, quality, and shock absorption, for example. Multiple subassemblies 100 may be supplied on a tape for mounting on a PCB using pick-and-place technology. For example, a tape assembly may comprise one or more subassemblies 100 held between a cavity tape and a cover tape.

Figures 1, 5:
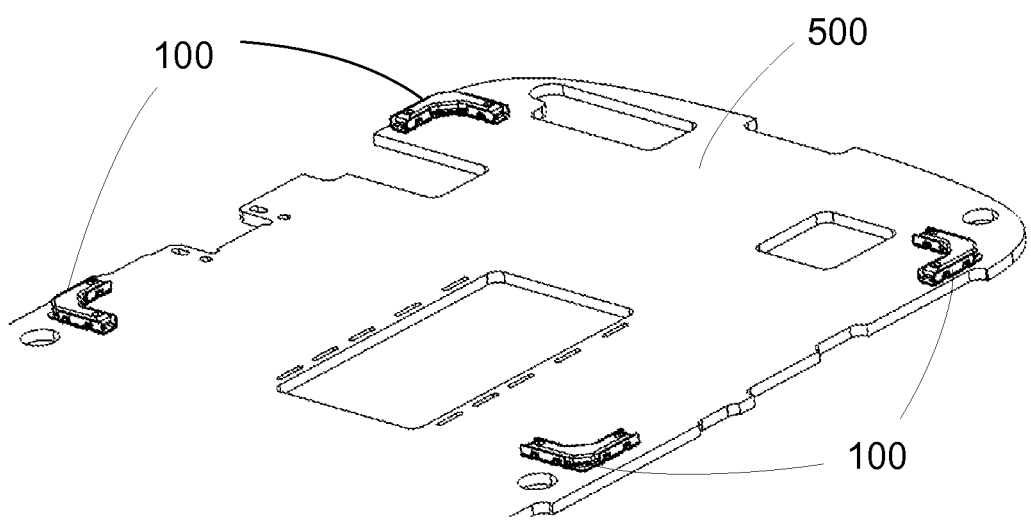
Figures 2, 5:
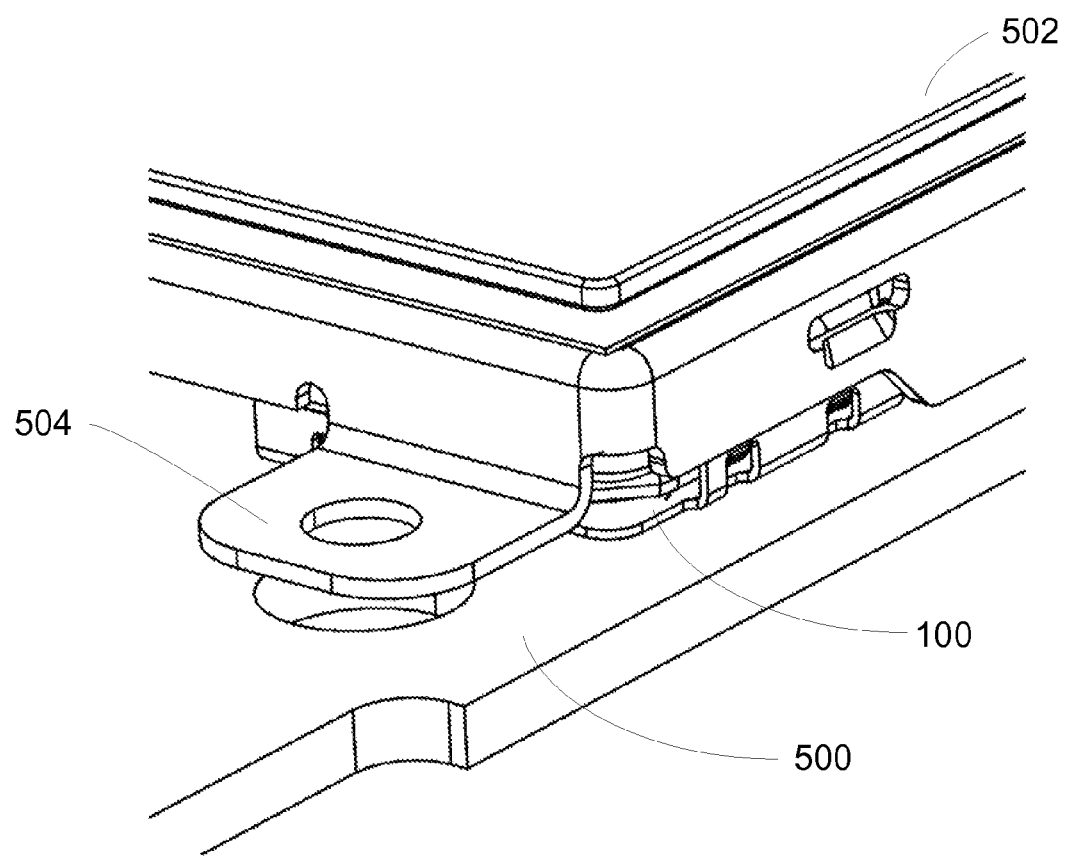

Subassembly 100 may be temporarily secured to the PCB at the desired location by solder paste. Solder paste may have been applied to the PCB earlier. More than one subassembly 100 may be mounted on a PCB for support of a display screen. For example, as illustrated in FIG. 5-1, four subassemblies 100 may be mounted on a PCB 500 at positions substantially corresponding to four corners of a display screen to be supported by subassemblies 100. In another example, alternate or additional subassemblies 100 may be mounted on PCB 500 for support of a display screen, for example, at other positions substantially corresponding to the periphery of the display screen or substantially corresponding to the middle of the display screen, or any other positions.

Once subassemblies 100 have been temporarily secured at the desired location, the entire assembly, including the PCB, the temporarily secured subassemblies 100, and any other surface mount components that have been mounted on or temporarily secured to the PCB, may be subjected to controlled heat to melt the solder paste and permanently connect subassemblies 100 to the PCB. This may be accomplished by passing the entire assembly through a reflow oven. As noted previously, subassembly 100 may comprise materials that are able to withstand reflow oven temperatures. Notably, solder may serve at least two distinct functions: adhering components to one another, and forming one or more electrical connections. In the case of the subassembly 100, there need not be any electrical connections (as subassembly 100 does not need any electrical components), so soldering may serve principally as an adhesive that affixes subassembly 100 to the PCB.

Following the reflow process, a display screen may be positioned such that its rear surface (which is opposite the front surface that displays images) is proximate to (and typically in contact with) outer surface 112 of outer portion 106 of second member 104 of each subassembly 100. The display screen may be a liquid crystal display (LCD) screen, an organic electroluminescent (OEL) display screen, an inorganic electroluminescent display screen, or any other display screen. In a variation, one or more subassemblies 100 may be mounted (e.g., by adhesive) to the display screen itself, and may bear against the PCB.

FIG. 5-2 illustrates a fragmentary perspective view of a display screen 502 being supported by one of subassemblies 100 mounted on PCB 500. There may be an electrical connection (not shown) between display screen 502 and PCB 500. Display screen 502 may be secured to PCB 500 using, for example, clips or screws or both or any other fasteners. For example, display screen 502 may be screwed down to PCB 500 through a tab 504. Subassembly 100 is interposed between display screen 502 and PCB 500, and spatially separates display screen 502 from PCB 500. Subassembly 100 may act as a cushion that prevents display screen 502 from being screwed down to a hard stop during mounting of the display screen 502 to the PCB 500. This may reduce stress on display screen 502 and prevent "hot spots" from forming on display screen 502.

Figure 6:
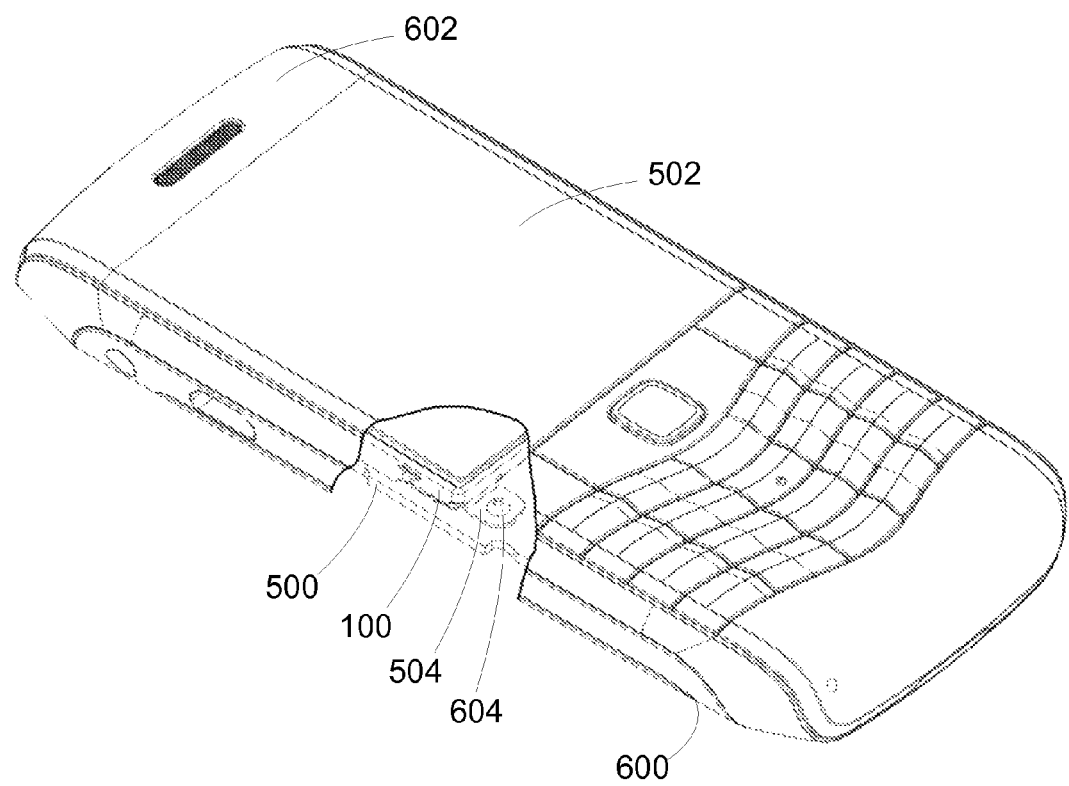
FIG. 6 is a cutaway perspective view of a display screen supported on a printed circuit board within an example electronic device by one of the example suspension and tolerance absorption subassemblies illustrated in FIG. 1.

FIG. 6 illustrates a cutaway perspective view of display screen 502 being supported by one of subassemblies 100 mounted on PCB 500 within an electronic device 600. FIG. 6 shows the front surface of display screen 502. Electronic device 600 is illustrated as a mobile communications device. Within a housing 602 of electronic device 600, display screen 502 is screwed down to PCB 500 using one or more screws 604 through one or more corresponding tabs 504. PCB 500 is typically secured within housing 602, so that housing 602 and PCB 500 remain in a substantially fixed position with respect to one another. Housing 602 may be made or formed of any of several materials, typically rigid and durable materials such as plastic or metal.

Figure 7:
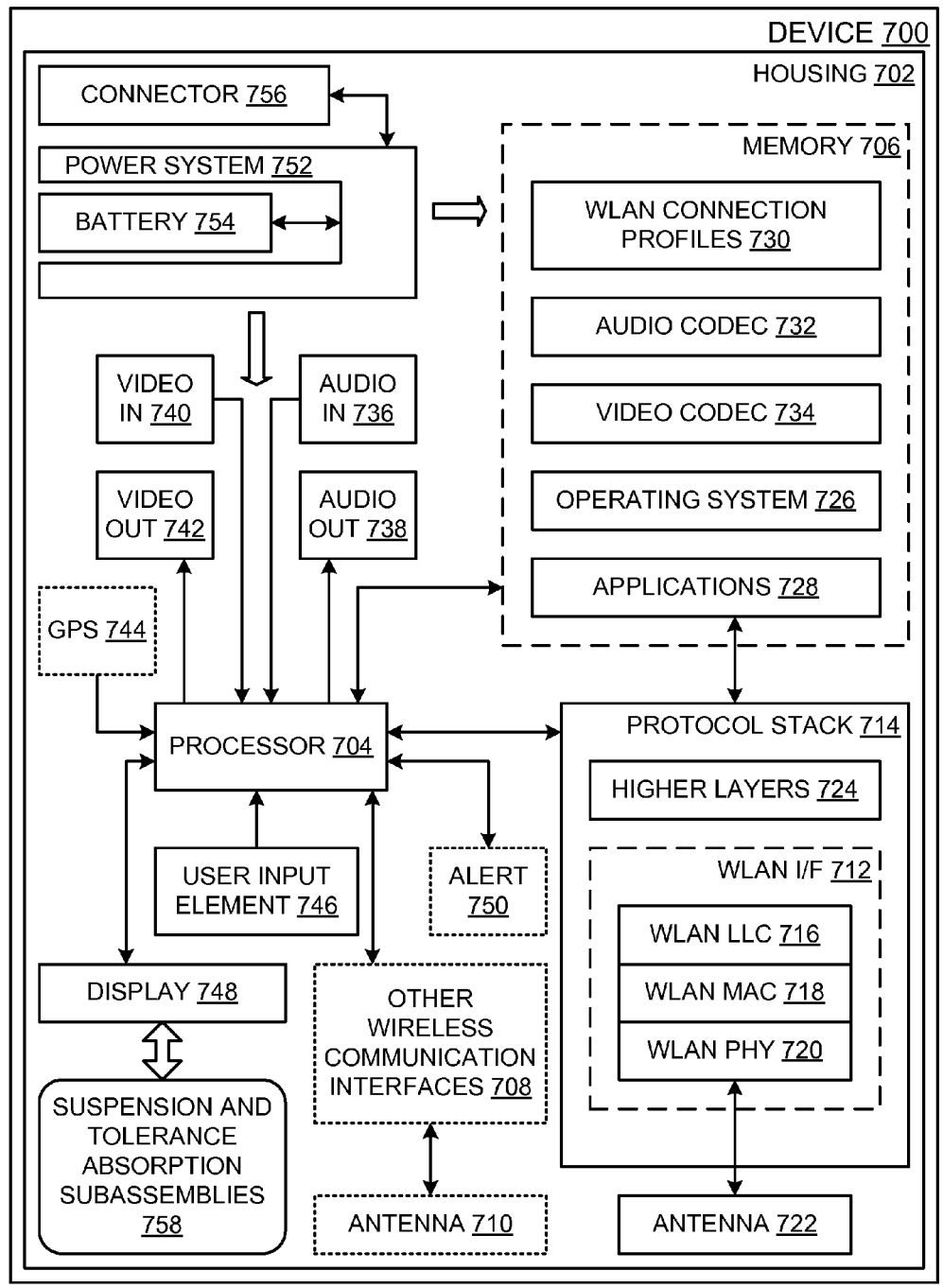
FIG. 7 is a block diagram of an example mobile communications device.

FIG. 7 is a simplified block diagram of an example mobile communications device 700. Device 700 is an example of electronic device 600. The components of device 700 are contained within a housing 702. Housing 702 is an example of housing 602.

Device 700 comprises a processor 704 coupled to a memory 706 and optionally to one or more other wireless communication interfaces 708. For example, other wireless communication interfaces 708 may comprise a short-range wireless communication interface such as a wireless personal area network interface, possibly compatible with Bluetooth®. In another example, other wireless communication interfaces 708 may comprise a wireless wide area network (WWAN) interface such as for cellular communications. One or more antennas 710 may be coupled to respective ones of the other wireless communication interfaces 708. An antenna may be shared among more than one wireless communication interface.

Device 700 also comprises a WLAN interface 712 within a protocol stack 714 that is coupled to processor 704. WLAN interface 712 comprises a WLAN LLC module 716, a WLAN MAC module 718 and a WLAN PHY module 720. WLAN MAC module 716 may be compatible with one or more standards of the family of IEEE 802.11 wireless communication standards. Device 700 also comprises an antenna 722 coupled to WLAN PHY module 720. Protocol stack 714 may comprise higher layers 724. Device 700 is able to communicate with a WLAN access point using WLAN interface 712.

Memory 706 may store an operating system 726 to be executed by processor 704. Memory 706 and processor 704, like many of the components described below, may be mounted to PCB 500 (which is not shown in FIG. 7). Memory 706 may store applications 728 installed in device 700 to be executed by processor 704. Memory 706 may also store data (not shown) used by operating system 726 and applications 728.

Memory 706 may store one or more WLAN connection profiles 730, each identifying a wireless local area network by its network name.

Memory 706 may store an audio coder-decoder (codec) 732 or a video codec 734 or both. A non-exhaustive list of examples for audio codec 732 includes G.711, G.722, G.723, G.726, G.729, MP3, Windows® Media Audio (WMA), Vector Sum Excited Linear Prediction (VSELP), Digital Speech Standard (DSS), and any other suitable audio codec. A non-exhaustive list of examples for video codec 734 includes H.261, H.263, H.264, flavors of Moving Picture Experts Group (MPEG), RealVideo®, Windows® Media Video, DivX®, Pixlet®, and any other suitable video codec.

Device 700 may comprise an audio input element 736 and an audio output element 738, both coupled to processor 704. Device 700 may comprise a video input element 740 and a video output element 742, both coupled to processor 704.

For example, applications 728 may comprise a VoIP application that works together with audio input element 736, audio output element 738, and audio codec 732. In another example, applications 728 may comprise a videoconferencing application that works together with audio input element 736, audio output element 738, audio codec 732, video input element 740, video output element 742, and video codec 734.

Device 700 may optionally comprise a Global Positioning System (GPS) module 744 coupled to processor 704.

Device 700 may comprise one or more user input elements 746 coupled to processor 704. Examples of user input elements include a keyboard, a keypad, a touch screen, a joystick, a thumbwheel, a roller, a touchpad, an optical pad, and the like.

Device 700 comprises a display screen 748 coupled to processor 704, where display screen 748 is a user output element of device 700. In the event that display screen 748 is a touch screen, it functions also as a user input element of device 700. Device 700 may comprise one or more additional user output elements coupled to processor 704.

Device 700 may optionally comprise one or more alert components 750 coupled to processor 704, to be activated in order to alert a user, for example, by sounding a buzzer, playing a ringtone, or vibrating.

Device 700 comprises a power system 752, one or more batteries 754 coupled to power system 752, and a connector 756 coupled to power system 752. Connector 756 is connectible to an external power source (not shown) to provide power for charging a power supply such as batteries 754 or for operating device 700 or for both. Power system 752 provides electrical coupling between the external power source and batteries 754, and provides electrical coupling between batteries 754 and the electrical components of device 700 (e.g. processor 704, memory 706, and the like). As part of the electrical coupling between the external power source and batteries 754, power system 752 may control the charging of batteries 754 with electrical charge drawn from the external power source.

Display screen 748 bears against and is supported by one or more suspension and tolerance absorption subassemblies 758 positioned between display screen 748 and the PCB to which display screen 748 is secured. (The double-ended arrow on FIG. 7 between display screen 748 and subassemblies 758 indicates a mechanical, rather than an electronic or signal-based, relationship between display screen 748 and subassemblies 758.) Subassemblies 758 are examples of subassembly 100. Each of subassemblies 758 is able to act as an independent suspension for display screen 748 and is able to cushion display screen 748 by absorbing mechanical tolerances and mechanical shock and vibration. With subassemblies 758, display screen 748 (or a portion thereof) has some restricted freedom to move in a direction toward the PCB. Movement toward the PCB is constrained by the cushioning of the subassemblies 758. In some circumstances (such as when display screen 748 has been pushed toward the PCB), the display screen 748 (or a portion thereof) has some restricted freedom to move in a direction away from the PCB, but this movement may be constrained by subassemblies 758 and the fasteners that secure display screen 748 to the PCB. Movement of display screen 748 in other directions (e.g., in any direction substantially parallel to a plane of the PCB) may likewise be constrained by subassemblies 758 and the fasteners.

Device 700 may comprise other elements that, for clarity, are not illustrated in FIG. 7. Similarly, device 700 may comprise a subset of the elements illustrated in FIG. 7.

One or more implementations may be used to realize one or more benefits, some of which have been mentioned already. Various implementations offer support and shock absorption for a display screen (an element that may be susceptible to damage in an impact), while also constraining the motion of the display screen with respect to the PCB or the housing. The shock absorption supplied by the subassemblies may address the stresses or forces or impacts—whether applied intentionally or unintentionally—that a display screen on a portable electronic device foreseeably may encounter. The shock absorption may help protect not only the display screen, but also the PCB, from damage. Further, various implementations may offer the capability for the display screen to be depressed on its front surface and to return (by the springiness of the cushioning of the subassemblies) to a neutral starting position. In other words, the subassemblies may supply protection against shocks, and may also supply the resilience to move a displaced display screen back to neutral starting position. Functions such as these can be performed without expenditure of electrical energy. Various implementations also support simplicity or efficiency of assembly, in that the subassemblies may have few moving parts and may be assembled using conventional techniques. In addition, a number of the implementations of the subassemblies may be capable of being affixed to a PCB in a procedure in which other components (such as electronic components) are affixed to the PCB; such techniques for assembly may be especially efficient in circumstances in which the electronic device has extended functionality and may have a substantial number of components affixed to the PCB. Many implementations of the subassembly offer a small "footprint," taking relatively little space on the PCB.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Further, as described herein, various elements may be in physical relationship with one another, such as being in contact with or bearing against one another. It is not always necessary, however, that the elements have such relationship directly. For example, two elements may be in contact with one another via an intervening element, or one element may bear against an interposing structure that in turn bears against the other element. In the case of claims that recite a means that performs a specified function, however, the structures described herein and depicted in the drawings, and equivalents thereof, corresponds to the recited means.

What is claimed is:

1. An electronic device comprising:
    a printed circuit board;
    a display screen secured to the printed circuit board; and
    a suspension and tolerance absorption subassembly mounted to the printed circuit board and interposed between the display screen and the printed circuit board, the suspension and tolerance absorption subassembly comprising:
        a first member affixed to the printed circuit board; and
        a second member having a substantially rigid outer portion bearing against a rear surface of the display screen and a flexible inner portion bearing against the outer portion and the first member.

2. The electronic device as claimed in claim 1, wherein the first member comprises steel.

3. The electronic device as claimed in claim 2, wherein the first member comprises stainless steel.

4. The electronic device as claimed in claim 1, wherein the outer portion of the second member comprises plastic.

5. The electronic device as claimed in claim 4, wherein the outer portion of the second member comprises injection molded siloxane copolymer resin.

6. The electronic device as claimed in claim 1, wherein the flexible inner portion of the second member comprises rubber.

7. The electronic device as claimed in claim 6, wherein the flexible inner portion of the second member comprises silicone rubber co-molded to the outer portion of the second member.

8. The electronic device as claimed in claim 1, wherein the first member comprises one or more channel-shaped portions, each channel-shaped portion to receive a corresponding portion of the second member.

9. The electronic device as claimed in claim 8, wherein the first member and the second member are attached by a snap-fit assembly.

10. The electronic device as claimed in claim 1, wherein the flexible inner portion of the second member comprises one or more protrusions to fill one or more corresponding recesses in the outer portion of the second member.

11. The electronic device as claimed in claim 1, further comprising a housing, wherein the printed circuit board is secured within the housing.

12. The electronic device as claimed in claim 1, wherein the display screen is a liquid crystal display.

13. The electronic device as claimed in claim 1, wherein the display screen comprises four corners, the electronic device further comprising four of the subassemblies, each of the four subassemblies having an L-shaped configuration and mounted on the printed circuit board at a position substantially corresponding to a corner of the display screen.

14. An apparatus comprising:
    a printed circuit board;
    a display screen having a front surface and a rear surface;
    a first substantially rigid support means;
    a second substantially rigid support means; and
    a flexible cushioning means,
    wherein the flexible cushioning means is interposed between the first substantially rigid support means and the second substantially rigid support means, and
    wherein the first substantially rigid support means, the second substantially rigid support means and the flexible cushioning means are interposed between the rear surface of the display screen and the printed circuit board.

15. The apparatus as claimed in claim 14, wherein the first substantially rigid support means comprises metal.

16. The apparatus as claimed in claim 14, wherein the second substantially rigid support means comprises siloxane copolymer resin.

17. The apparatus as claimed in claim 16, wherein the flexible cushioning means comprises silicone rubber.

18. The apparatus as claimed in claim 17, wherein the flexible cushioning means is co-molded to the second substantially rigid support means.

* * * * *